US012735088B2

(12) United States Patent
Weber et al.

(10) Patent No.: US 12,735,088 B2
(45) Date of Patent: Sep. 15, 2026

(54) STROLLER TRAY

(71) Applicant: TWEELY INC., Spring Valley, NY (US)

(72) Inventors: Samuel Weber, Spring Valley, NY (US); Esther Weber, Spring Valley, NY (US)

(73) Assignee: TWEELY INC., Spring Valley, NY (US)

( * ) Notice: Subject to any disclaimer, the term of this patent is extended or adjusted under 35 U.S.C. 154(b) by 0 days.

(21) Appl. No.: 19/255,394

(22) Filed: Jun. 30, 2025

(65) Prior Publication Data

US 2025/0326422 A1 Oct. 23, 2025

Related U.S. Application Data

(63) Continuation of application No. 29/954,888, filed on Jul. 30, 2024, now abandoned, and a continuation of application No. 29/954,955, filed on Jul. 30, 2024, now Pat. No. Des. 1,104,883, said application No. 29/954,888 is a continuation-in-part of application No. 29/878,221, filed on Jun. 19, 2023, now Pat. No. Des. 1,045,695.

(51) Int. Cl.
*B62B 9/26* (2006.01)
*A47D 1/00* (2006.01)

(52) U.S. Cl.
CPC .............. *B62B 9/26* (2013.01); *A47D 1/0085* (2017.05)

(58) Field of Classification Search
CPC ........ B62B 9/26; A47D 1/0085; B60N 3/002; B60N 3/005
USPC ........... 248/104; 224/409, 547, 407; 108/44; D12/133; D7/550.1, 553.1, 553.6
See application file for complete search history.

(56) References Cited

U.S. PATENT DOCUMENTS 3,003,727 A * 10/1961 Medor .................. A61J 9/0692 248/104
3,143,374 A * 8/1964 Corboni ................. A47D 1/008 248/117.7
D204,071 S * 3/1966 Earl ............................ D7/553.1
D324,504 S * 3/1992 Olsen ........................... D12/133
D351,738 S * 10/1994 LaCombe .................... D12/416
(Continued)

FOREIGN PATENT DOCUMENTS

CN 3315293 D 8/2003

*Primary Examiner* — Justin M Larson
(74) *Attorney, Agent, or Firm* — DUANE MORRIS LLP

(57) ABSTRACT

A stroller tray includes a tray portion comprising at least one cup holder and at least one snack compartment and at least two bendable arms. The bendable arms are detachably connected to the tray portion by at least one mount on the outer end of the tray portion. The bendable arms attach to a stroller bumper bar by wrapping around the stroller bumper bar while the tray portion remains level with the stroller bumper bar. The bendable arms each contain an inner bendable rod. A method of providing a stroller tray includes providing a tray portion comprising at least one cup holder and at least one snack compartment; and providing at least two bendable arms. The method of providing a stroller tray further includes providing at least one mount on the outer end of the tray portion to detachably connect the bendable arms to the tray portion.

17 Claims, 6 Drawing Sheets

(56) References Cited

U.S. PATENT DOCUMENTS 5,356,107 A * 10/1994 Sinohuiz .................. A47C 7/62 248/223.41
5,382,074 A * 1/1995 Pietra .................... A47B 23/02 297/487
D357,440 S * 4/1995 Pietra .......................... D12/133
D363,643 S * 10/1995 Eisenberg ..................... D7/546
5,458,394 A 10/1995 Nichols et al.
5,531,238 A * 7/1996 Azzarelli ................ A61H 3/00 248/231.21
5,769,367 A * 6/1998 Bradley ............... A61J 9/0638 248/104
5,816,648 A 10/1998 Baccili et al.
5,964,501 A 10/1999 Magnani
D423,290 S * 4/2000 Green ........................ D7/553.5
6,129,416 A * 10/2000 Bowen .................... A47C 7/66 160/368.1
6,139,046 A 10/2000 Aalund et al.
6,142,350 A * 11/2000 Alexander .............. B60R 11/00 224/555
D435,196 S * 12/2000 Gregor ....................... D7/553.5
6,206,464 B1 * 3/2001 Santa Rosa ............. A47C 7/68 297/173
6,368,006 B1 4/2002 Yang et al.
6,464,244 B1 * 10/2002 Cheng ....................... B62B 7/08 280/650
D527,953 S * 9/2006 Le Gal ........................ D7/552.1
7,793,904 B2 * 9/2010 Scarton .............. A47G 23/0225 248/230.5
8,056,921 B2 11/2011 Dotsey et al.
D650,639 S 12/2011 Freese et al.
8,235,190 B2 * 8/2012 Porte ......................... A45F 5/00 248/104
8,282,119 B1 * 10/2012 Caksa ..................... B62B 7/008 280/647
8,973,928 B2 * 3/2015 Mellinger ................. B62B 9/26 280/47.35
9,565,929 B2 * 2/2017 Flannery .............. A47B 23/002
10,081,382 B1 * 9/2018 Alton ..................... F16M 11/40
10,450,125 B2 * 10/2019 Haden .................. B65D 83/771
D943,279 S * 2/2022 Weber ............................ D3/327
D967,673 S * 10/2022 Chen .......................... D7/553.6
11,618,493 B2 * 4/2023 Jackson .................... B62B 9/00 280/769
D1,045,515 S * 10/2024 Padgett ....................... D7/553.1
D1,045,695 S * 10/2024 Weber .......................... D12/133
2009/0033118 A1 2/2009 Gomez
2010/0122994 A1 * 5/2010 Chuang ...................... B62J 9/21 224/558
2018/0086359 A1 3/2018 Hanson et al.

* cited by examiner 60
80
40

80
30
50

STROLLER TRAY

CROSS REFERENCE TO RELATED APPLICATIONS

This application is a continuation application claiming priority under 35 U.S.C. § 120 to U.S. Design patent application Ser. No. 29/954,955, entitled STROLLER TRAY, filed Jul. 30, 2024 and to U.S. Design patent application Ser. No. 29/954,888, entitled STROLLER TRAY, filed Jul. 30, 2024, both of which claim priority under 35 U.S.C. § 120 to U.S. Design patent application Ser. No. 29/878,221, now U.S. Pat. No. D1,045,695, entitled STROLLER TRAY, filed Jun. 19, 2023, the entire content of which is hereby incorporated by reference herein.

BACKGROUND

This disclosure relates to components and accessories for baby and children's strollers, specifically stroller trays.

Stroller trays are a convenience for caregivers and children alike. They allow babies or children access to food, drinks, and toys while on-the-go, without requiring that the caregivers or children hold the items continuously or store them where the caregivers must reach for and hand the children each item every time the children desire it.

However, all stroller trays are not the same. If a stroller tray does not have a secure design, there is a risk of its connection to the stroller failing and the tray as well as any items on the tray may fall off. On the other hand, if a stroller tray design causes the tray to be secured too tightly, caregivers may have difficulty removing the stroller tray for cleaning purposes.

A stroller tray must also be accessible to caregivers to place items on the tray and to children sitting in the stroller to reach the items. Stroller trays should also have snack compartments that are deep enough to ensure that snacks remain inside the compartments even on rough terrain.

Additionally, certain trays are manufactured in configurations that are compatible with only certain brands of strollers or strollers with bars in specific shapes and sizes. Such configuration limits the number of strollers to which a stroller tray can be attached.

Stroller trays should also be designed to be able to remain attached to the stroller when the stroller is folded and not require removal.

Further, the height of the stroller tray is important, as children must be able to see and reach their snacks on the tray when they are sitting in the stroller.

SUMMARY

One object of the present invention is to provide a stroller tray that securely attaches to a stroller.

Another object of the present invention is to provide a stroller tray that is easily accessible to caregivers and to children sitting in the stroller.

Another object of the present invention is to provide a stroller tray that is compatible with numerous types of strollers.

Another object of the present invention is to provide a stroller tray that attaches to a stroller at a height where children are able to see and reach their snacks on the tray when they are sitting in the stroller.

Another object of the present invention is to provide a stroller tray with an adjustable height when secured to a stroller.

Some embodiments of the present invention are directed to a stroller tray including a tray portion comprising at least one cup holder and at least one snack compartment and at least two bendable arms.

In some embodiments of the present invention, the at least two bendable arms are tubular in shape when not bent and are detachably connected to said tray portion by at least one mount on the outer end of the tray portion.

In some embodiments of the present invention, at least two bendable arms attach to a stroller bumper bar by wrapping around the stroller bumper bar and gripping the stroller bumper bar while the tray portion remains level with the stroller bumper bar.

In some embodiments of the present invention, at least one cup holder is circular in shape and has a contoured surface.

In some embodiments of the present invention, at least one cup holder is sized to hold standard-size bottles and children's sippy cups.

In some embodiments of the present invention, at least one cup holder is sized to accommodate any size drink container, including large bottles and cups.

In some embodiments of the present invention, at least one snack compartment has a contoured surface that is larger in width than at least one cup holder but smaller in depth than at least one cup holder.

In some embodiments of the present invention, at least one snack compartment is generally oval in shape, with a wall of at least one snack compartment adjoining at least one cup holder being curved to wrap around the circular edge of at least one cup holder.

In some embodiments of the present invention, the tray portion is curved in a U-shape to align with the shape of a curved stroller bumper bar.

In some embodiments of the present invention, at least two bendable arms are coated in gripping materials.

In some embodiments of the present invention, at least two bendable arms are coated in silicone.

In some embodiments of the present invention, at least two bendable arms each contain an inner bendable rod.

In some embodiments of the present invention, the inner bendable rod is made of metal material.

In some embodiments of the present invention, the tray portion can be easily detached from said at least two bendable arms.

In some embodiments of the present invention, the tray portion is dishwasher safe.

Some embodiments of the present invention are directed to a method of providing a stroller tray including providing a tray portion comprising at least one cup holder and at least one snack compartment; and providing at least two bendable arms.

In some embodiments of the present invention, the method of providing a stroller tray further including providing at least two bendable arms in a tubular shape when not bent; providing at least one mount on the outer end of the tray portion to detachably connect at least two bendable arms to the tray portion; and providing at least one mount in a location wherein at least two bendable arms attach to a stroller bumper bar while the tray portion remains level with the stroller bumper bar.

In some embodiments of the present invention, the method of providing a stroller tray further including providing at least one cup holder that is circular in shape and has a contoured surface; providing at least one cup holder that is sized to hold standard-size bottles and children's sippy cups; providing at least one snack compartment that has a contoured surface that is larger in width than at least one cup holder but smaller in depth than at least one cup holder; providing at least one snack compartment that is generally oval in shape, with a wall of at least one snack compartment adjoining at least one cup holder being curved to wrap around the circular edge of at least one cup holder.

In some embodiments of the present invention, the method of providing a stroller tray further including providing at least two bendable arms that are coated in gripping materials; and providing at least two bendable arms that each contain an inner bendable rod.

The above and other features, elements, characteristics, steps, and advantages of the present invention will become more apparent from the following detailed description of preferred embodiments of the present invention with reference to the attached drawings.

DETAILED DESCRIPTION OF PREFERRED EMBODIMENTS

Figure 1:
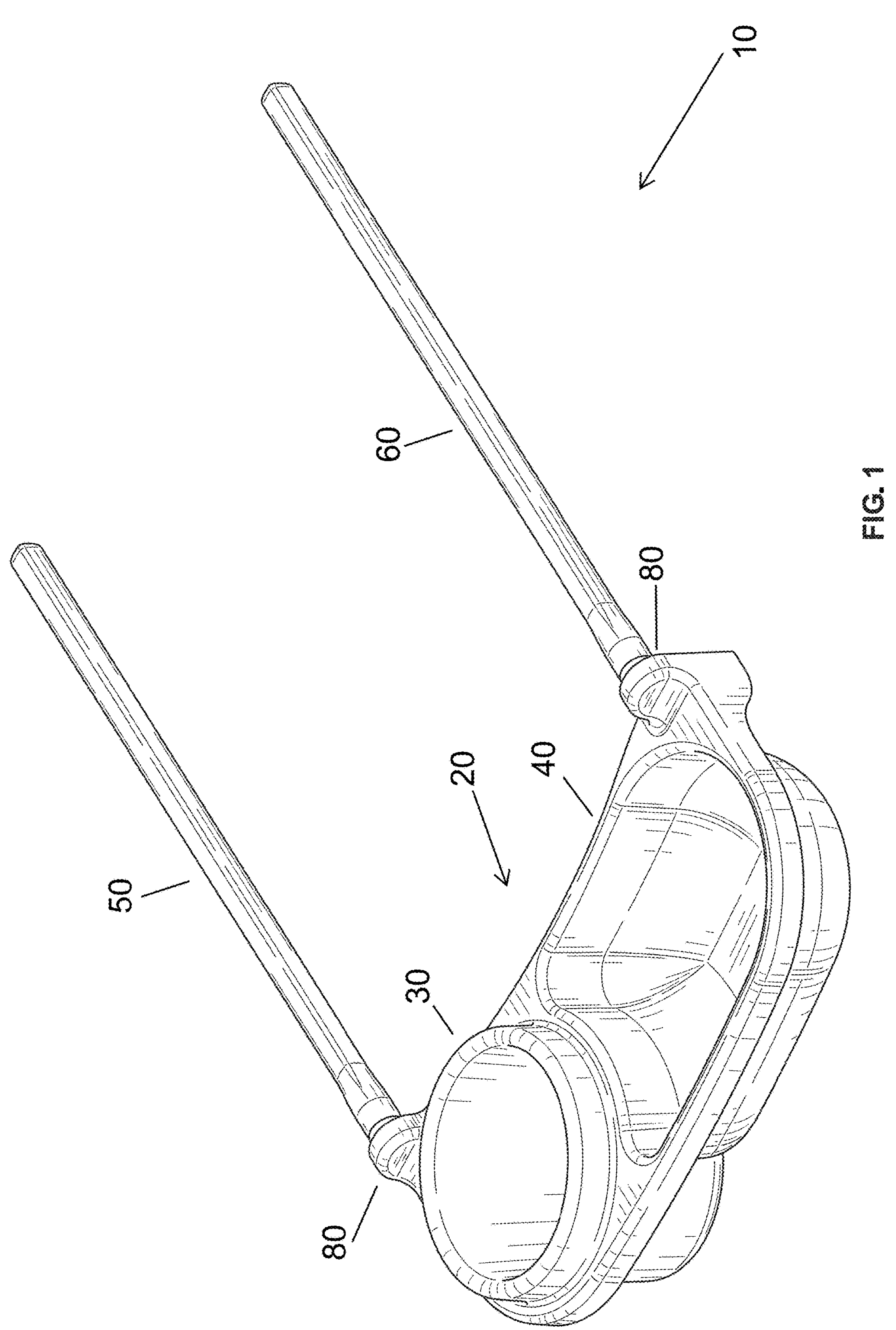
FIG. 1 is a perspective view of the stroller tray in accordance with one embodiment of the present invention.
Figure 2:
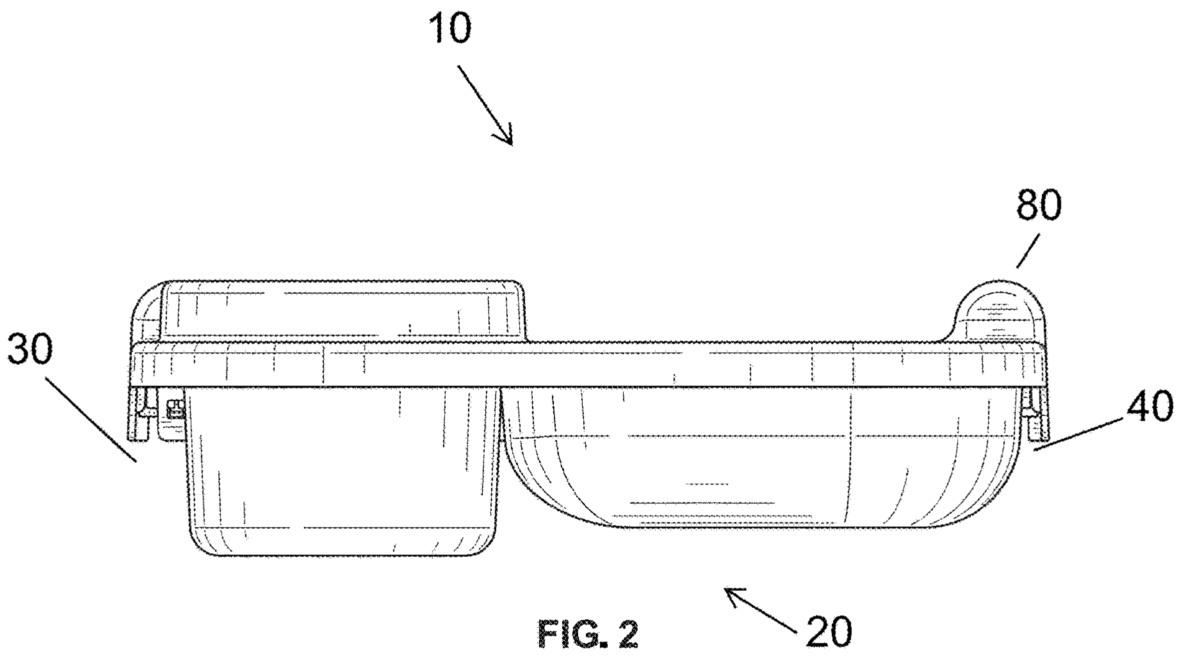
FIG. 2 is a front view of the stroller tray in accordance with one embodiment of the present invention.
Figure 3:
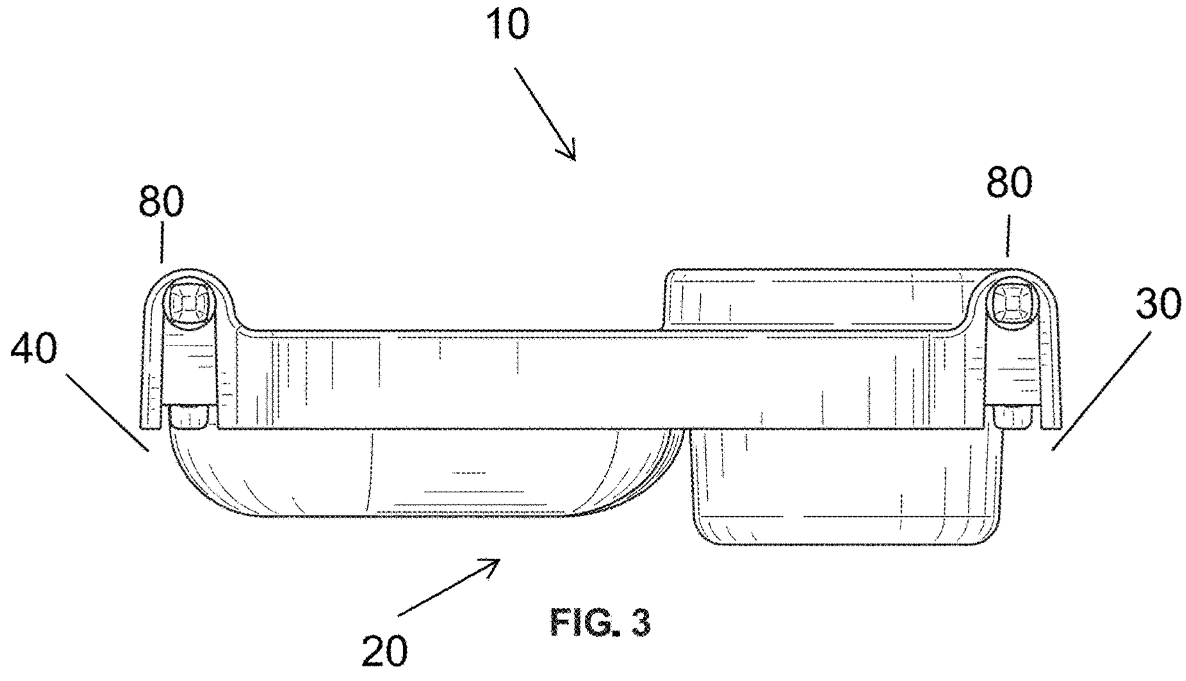
FIG. 3 is a rear view of the stroller tray in accordance with one embodiment of the present invention.
Figures 4, 5:
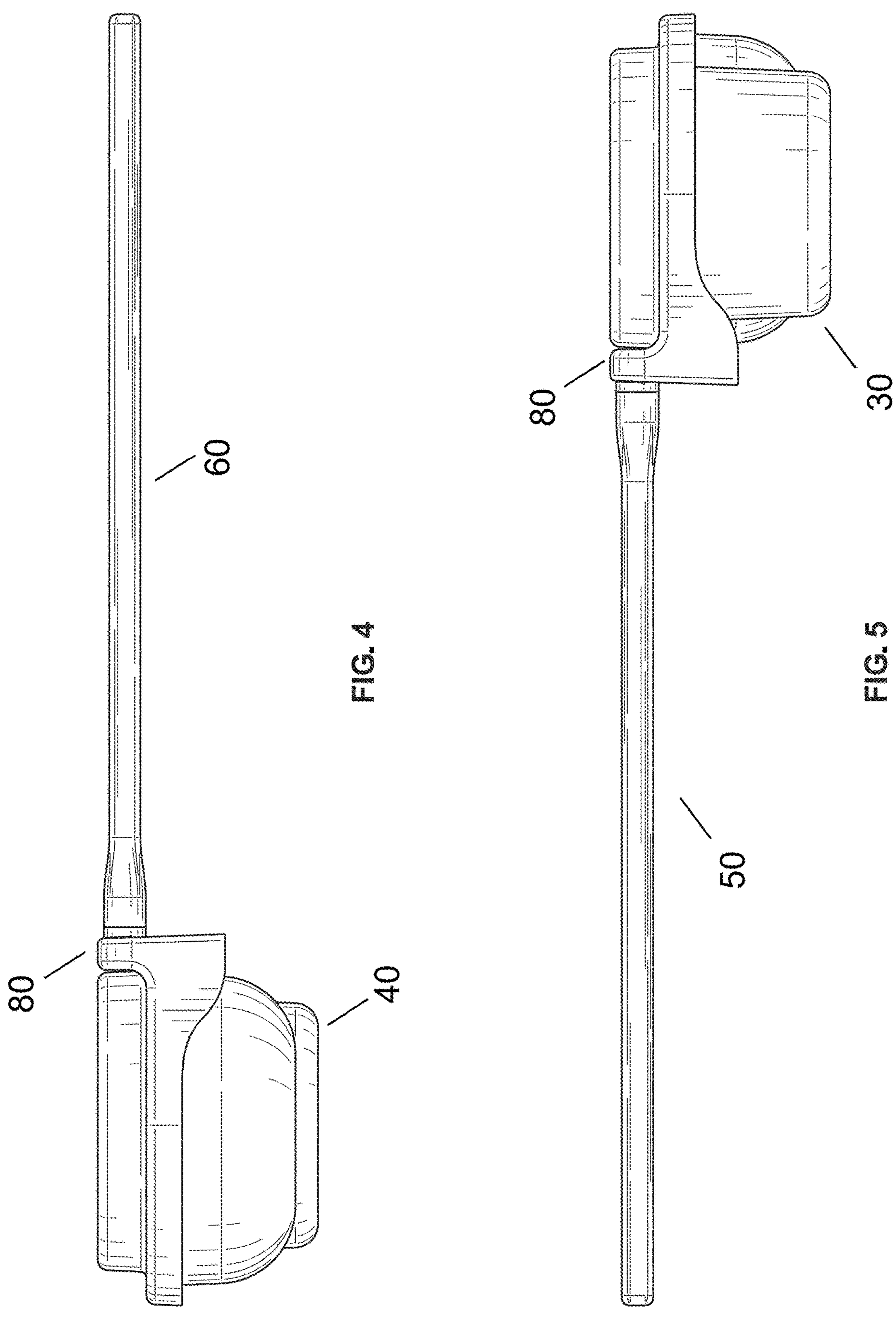
FIG. 4 is a left view of the stroller tray in accordance with one embodiment of the present invention.
FIG. 5 is a right view of the stroller tray in accordance with one embodiment of the present invention.
Figure 6:
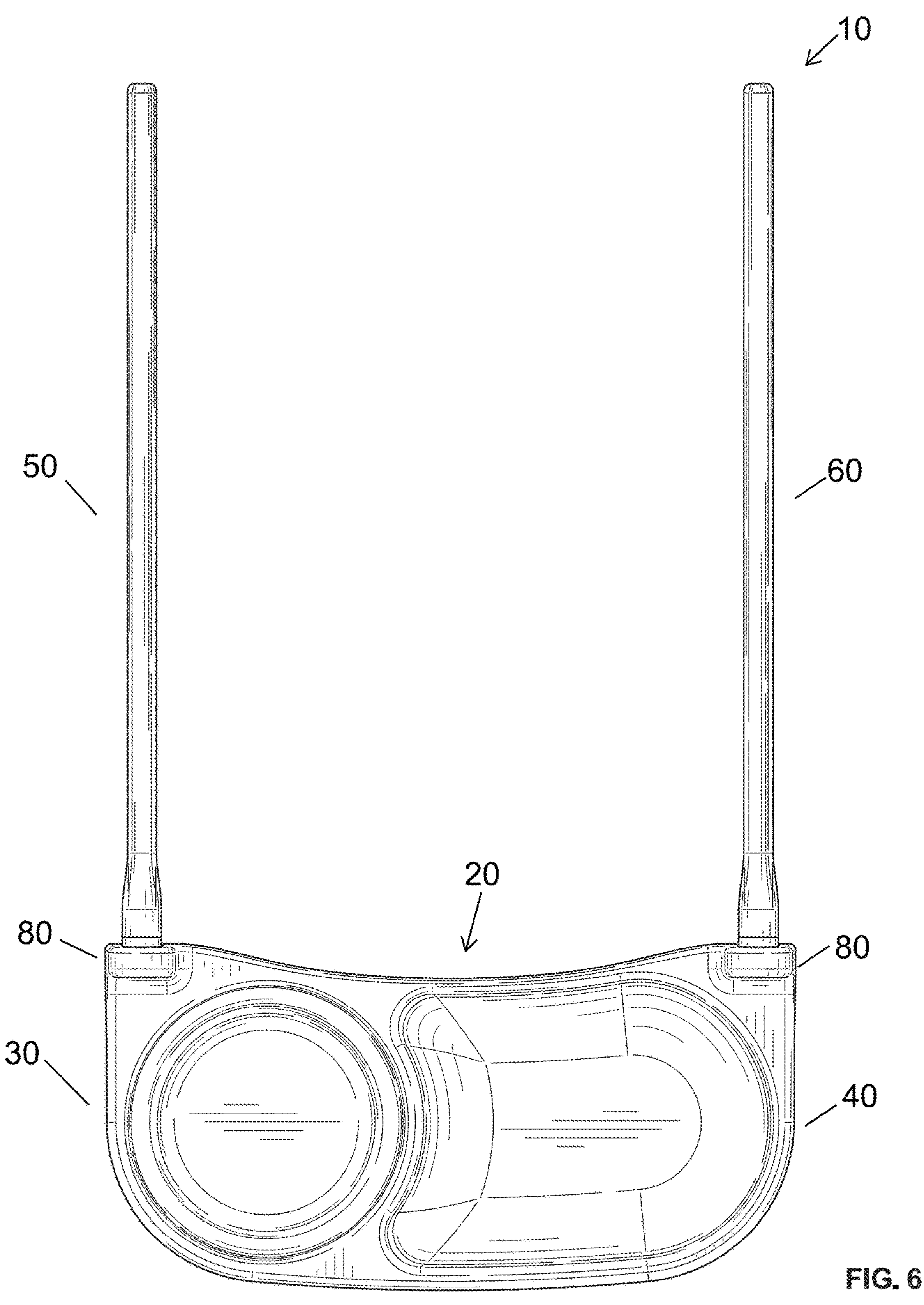
FIG. 6 is a top view of the stroller tray in accordance with one embodiment of the present invention.
Figure 7:
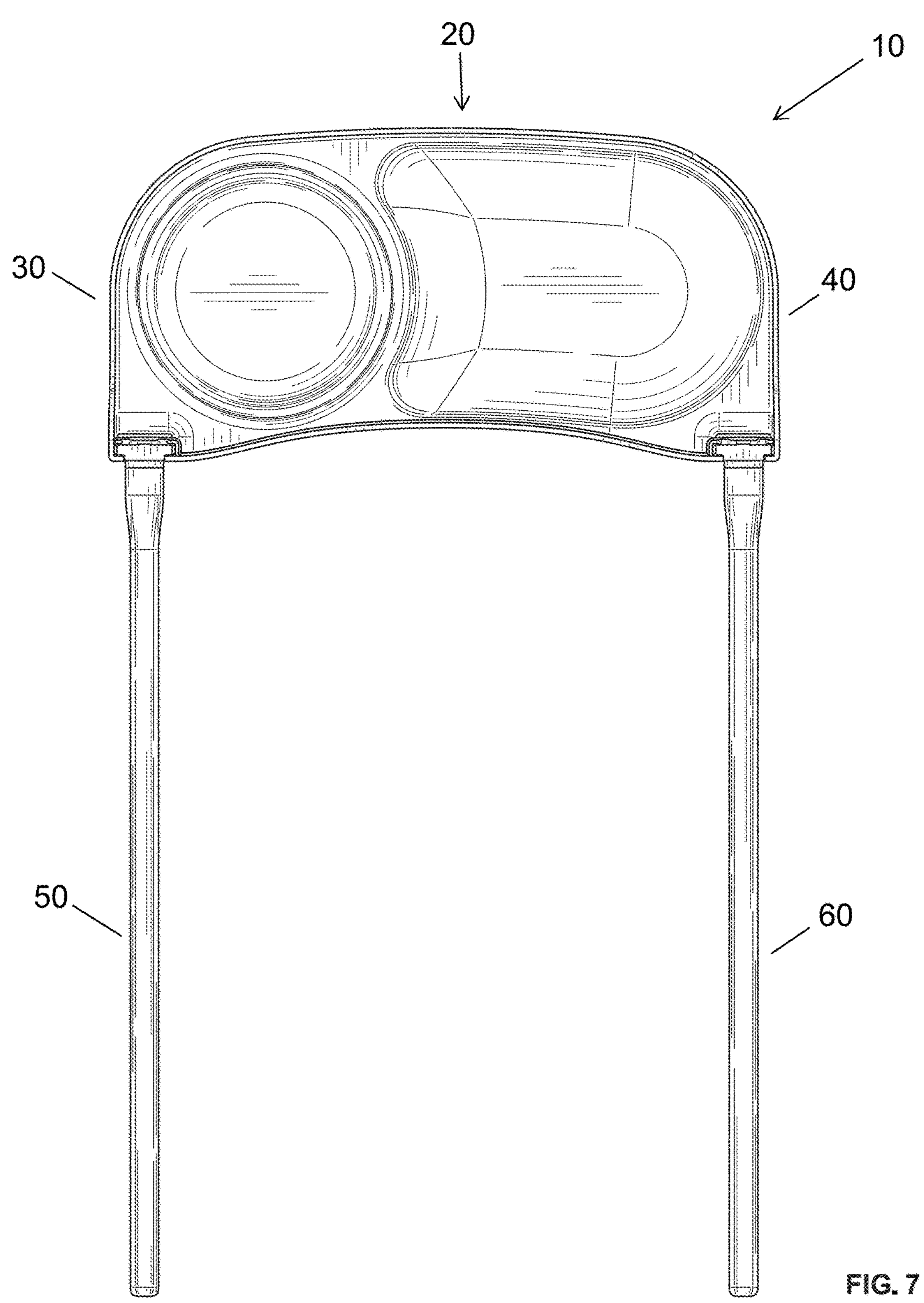
FIG. 7 is a bottom view of the stroller tray in accordance with one embodiment of the present invention.

FIGS. 1-7 illustrate embodiments of the disclosed invention. Stroller tray 10 includes a tray portion 20 containing at least one cup holder 30 and at least one snack compartment 40. Stroller tray 10 may also contain at least two bendable arms 50, 60.

In some embodiments, cup holder 30 is circular in shape and has a contoured surface for cradling a cup. Cup holder 30 may be sized to hold standard-size bottles and children's sippy cups in a secure fashion. Alternatively, cup holder 30 may be sized to accommodate any size drink container, including large bottles and cups.

In some embodiments, snack compartment 40 has a contoured surface that may be larger in width than cup holder 30 but may be smaller in depth than cup holder 30. Snack compartment 40 may be generally oval in shape, with the wall of snack compartment 40 that adjoins cup holder 30 being curved to wrap around the circular edge of cup holder 30.

Figure 8:
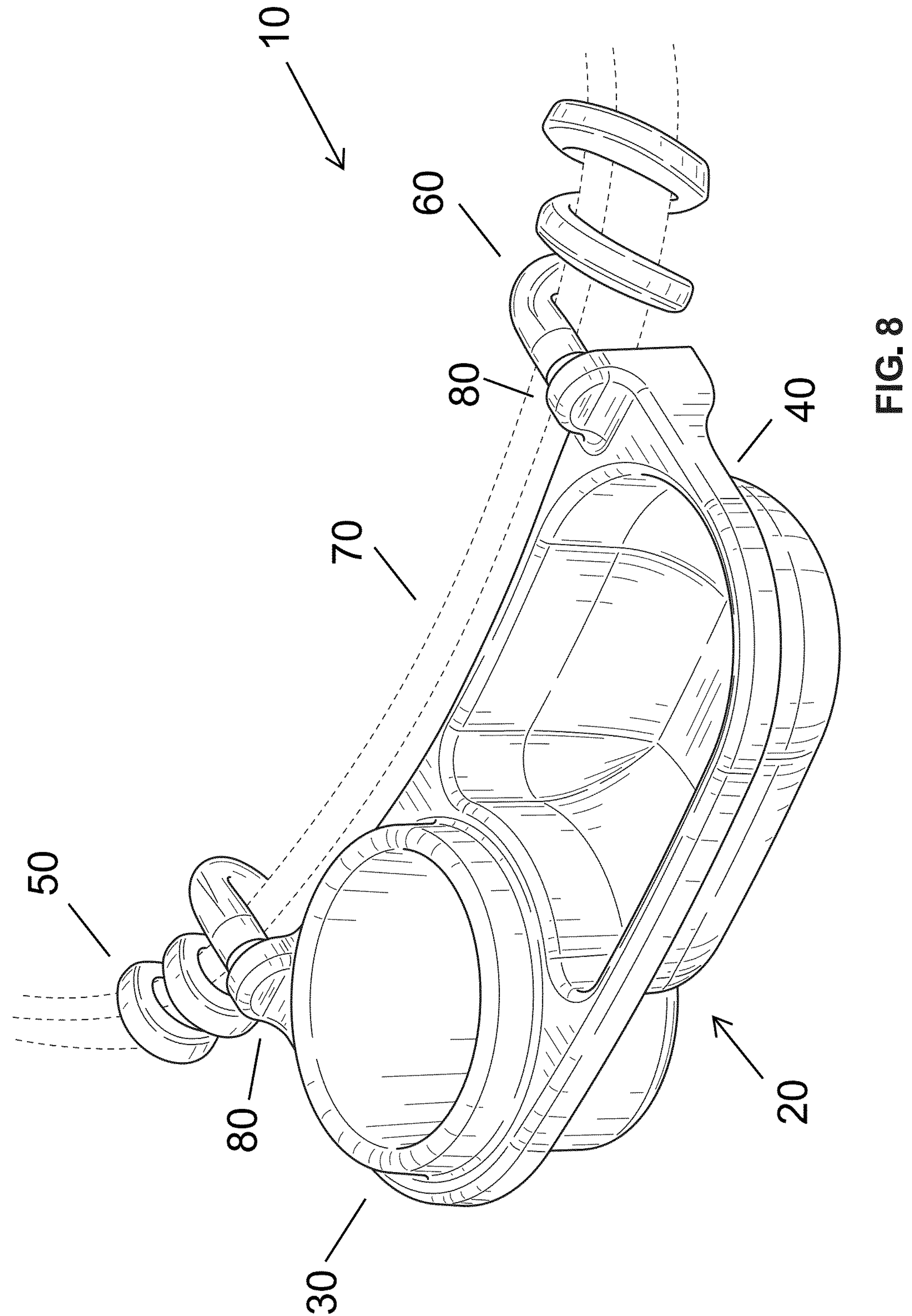
FIG. 8 is a perspective view of the stroller tray with coiled arms in accordance with one embodiment of the present invention.

As shown in FIG. 8, tray portion 20 may be curved in a U-shape to align with the shape of curved stroller bumper bar 70 for a seamless fit with strollers.

As shown in FIGS. 1-8, bendable arms 50, 60 may be tubular in shape when not bent and may be detachably connected to tray portion 20 by at least one mounts 80 on the outer end of tray portion 20. At least one mount 80 may be raised above tray portion 20. At least one mount 80 may be directly formed from the outer end of tray portion 20. Bendable arms 50, 60 may attach to stroller bumper bar 70 by wrapping around stroller bumper bar 70 and gripping stroller bumper bar 70 securely. At least one mount 80 ensures that tray portion 20 remains level with stroller bumper bar 70, thereby facilitating easy access to tray portion 20 for children sitting in a stroller.

Bendable arms 50, 60 may be coated in silicone or other similar gripping materials and may each contain an inner metal bendable rod, which prevents bendable arms 50, 60 from uncoiling too easily.

Stroller tray 10 is designed to remain attached to stroller bumper bar 70 when a stroller is folded and does not require removal for folding of a stroller.

In some embodiments, tray portion 20 can be easily detached from bendable arms 50, 60 and is dishwasher safe.

It should be understood that the foregoing description is only illustrative of the present invention. Various alternatives and modifications can be devised by those skilled in the art without departing from the present invention. Accordingly, the present invention is intended to embrace all such alternatives, modifications, and variances that fall within the scope of the appended claims.

What is claimed is:

1. A stroller tray comprising:

a tray portion including a top surface and a bottom surface, outer ends formed by side walls at a periphery of said tray portion, at least one cup holder and at least one snack compartment, said cup holder and said snack compartment being located on the top surface interiorly of the peripheral outer ends, and at least two bendable arms, each being detachably connected to said tray portion at a side wall forming a first outer end location by at least one mount, the at least two bendable arms on the outer end of said tray portion being detachably attachable to a bumper bar of a stroller, wherein the stroller tray is supported at said first outer end side wall of said tray portion from the bumper bar by said stroller when at least two bendable arms are wrapped about at least a portion of the bumper bar, and wherein an outer end of said tray portion at a location opposite said first outer end, and the bottom surface of the tray portion, being unsupported.

2. The stroller tray of claim 1, wherein said at least two bendable arms are tubular in shape when not bent and are attachable to said bumper bar having said arms wrapped around said stroller bumper bar while said tray portion remains cantilever supported and level with said stroller bumper bar.

3. The stroller tray of claim 1, wherein said at least one cup holder is sized to hold bottles and children's sippy cups.

4. The stroller tray of claim 1, wherein said at least one cup holder is sized to accommodate any size drink container, including large bottles and cups.

5. The stroller tray of claim 1, wherein said at least one snack compartment has a contoured surface that is larger in width than said at least one cup holder but smaller in depth than said at least one cup holder.

6. The stroller tray of claim 1 wherein said tray portion is curved in a U-shape to align with the shape of a curved stroller bumper bar.

7. The stroller tray of claim 1, wherein said at least two bendable arms are coated in gripping materials.

8. The stroller tray of claim 1, wherein said at least one mount is directly formed from an outer end of said tray portion.

9. The stroller tray of claim 1, wherein said at least one cup holder is circular in shape and has a contoured surface.

10. The stroller tray of claim 9, wherein said at least one snack compartment is generally oval in shape, with a wall of said at least one snack compartment adjoining said at least one cup holder being curved to wrap around the circular edge of said at least one cup holder.

11. The stroller tray of claim 1, wherein said at least two bendable arms each contain an inner bendable rod.

12. The stroller tray of claim 11, wherein said inner bendable rod is made of metal material.

13. A method of providing a stroller tray comprising:

providing a tray portion having at least one cup holder and at least one snack compartment, wherein said snack compartment is flat and is located within a single plane; and providing at least two bendable arms, each detachably connected to said tray portion by at least one mount at a first outer end location at a periphery of said tray portion, said at least two bendable arms, each detachably connected to a bumper bar of a stroller, and bending at least one of said bendable arms so that it is at least partially wrapped about said bumper bar for support of said stroller tray from the stroller bumper bar such that the tray is only supported at the first outer end of the tray and not at an opposite outer end of the tray or at a bottom surface of the tray.

14. The method of claim 13, further comprising: providing said at least two bendable arms in a tubular shape when not bent.

15. The method of claim 13, further comprising:

providing said at least one cup holder that is circular in shape and has a contoured surface; providing said at least one cup holder that is sized to hold bottles and children's childrens' sippy cups;

providing said at least one snack compartment that has a contoured surface that is larger in width than said at least one cup holder but smaller in depth than said at least one cup holder;

providing said at least one snack compartment that is generally oval in shape, with a wall of said at least one snack compartment adjoining said at least one cup holder being curved to wrap around the circular edge of said at least one cup holder.

16. The method of claim 13, further comprising:

providing said at least two bendable arms that are coated in gripping materials;

providing said at least two bendable arms that each contain an inner bendable rod.

17. The method of claim 13, further comprising:

providing said tray portion that is curved in a U-shape to align with the shape of a curved stroller bumper bar.

* * * * *